US007585919B2

(12) United States Patent
Pocius et al.

(10) Patent No.: US 7,585,919 B2
(45) Date of Patent: Sep. 8, 2009

(54) POLYMER DERIVED FROM MONOMERS WITH LONG-CHAIN ALIPHATIC, POLY(OXYALKYLENE) AND SUBSTRATE-REACTIVE GROUPS

(75) Inventors: Alphonsus V. Pocius, Maplewood, MN (US); Jeremy M. Yarwood, Maplewood, MN (US); Rudolf J. Dams, Antwerp (BE); John J. Stofko, Jr., St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 374 days.

(21) Appl. No.: 11/535,255

(22) Filed: Sep. 26, 2006

(65) Prior Publication Data

US 2008/0075960 A1 Mar. 27, 2008

(51) Int. Cl.
*B32B 27/30* (2006.01)
*C08L 33/14* (2006.01)

(52) U.S. Cl. .............. 525/326.5; 428/423.7; 428/424.4; 428/429; 428/430; 428/442; 428/447; 428/451; 428/458; 428/463; 428/483; 428/516; 428/520; 428/522; 525/100; 525/123; 525/175; 525/176; 525/187; 525/203; 525/209; 525/217; 525/218; 525/223; 525/327.1; 525/328.2; 525/328.5; 525/328.9

(58) Field of Classification Search ....................... None
See application file for complete search history.

(56) References Cited

U.S. PATENT DOCUMENTS

| | | | |
|---|---|---|---|
| 3,574,791 | A | 4/1971 | Sherman et al. |
| 3,728,151 | A | 4/1973 | Sherman et al. |
| 3,787,351 | A | 1/1974 | Olson |
| 3,816,167 | A | 6/1974 | Schultz et al. |
| 3,920,614 | A | 11/1975 | Kirimoto et al. |
| 3,950,298 | A | 4/1976 | McCown et al. |
| 4,046,944 | A | 9/1977 | Mueller et al. |
| 4,557,837 | A | 12/1985 | Clark, III et al. |
| 4,624,889 | A | 11/1986 | Bries |
| 4,668,726 | A | 5/1987 | Howells |
| 4,681,790 | A | 7/1987 | Fong |
| 4,795,793 | A | 1/1989 | Amimoto et al. |
| 4,859,754 | A | 8/1989 | Maekawa et al. |
| 5,075,400 | A | 12/1991 | Andrade et al. |

(Continued)

FOREIGN PATENT DOCUMENTS

| | | |
|---|---|---|
| EP | 0 234 601 | 9/1987 |

(Continued)

OTHER PUBLICATIONS

Lee, J. H., et al., "Blood Compatibility of Polyethylene Oxide Surfaces", *Prog. Polyrm. Sci.*, vol. 20, p. 1043-1079 (1995).

(Continued)

*Primary Examiner*—Robert Sellers
(74) *Attorney, Agent, or Firm*—Kent S. Kokko

(57) ABSTRACT

The present invention provides a curable composition for use in retarding the formation of biofilms. The curable composition comprises a polymer derived from ethylenically unsaturated units having pendent long-chain aliphatic groups; ethylenically unsaturated units having pendent poly (oxyalkylene) groups; and ethylenically unsaturated units having pendent substrate-reactive groups; and a crosslinking agent.

23 Claims, 7 Drawing Sheets

Absorbance at 590 nm 0.4
0.35
0.3
0.25
0.2
0.15
0.1
0.05
0

Blank 90% 80% 36% 18% Control A Control B

Weight % of Lauryl Methacrylate (remainder is 1000MW PEG-MA and 10% Methacryloxypropyl trimethoxy silane)

U.S. PATENT DOCUMENTS

| | | | | |
|---|---|---|---|---|
| 5,350,795 | A | 9/1994 | Smith et al. | |
| 5,374,501 | A | 12/1994 | Holmes et al. | |
| 5,585,407 | A | 12/1996 | Patel et al. | |
| 5,712,027 | A | 1/1998 | Ali et al. | |
| 5,879,623 | A | 3/1999 | Glover et al. | |
| 5,998,549 | A | 12/1999 | Milbourn et al. | |
| 6,004,438 | A | 12/1999 | Woodson | |
| 6,037,429 | A | 3/2000 | Linert et al. | |
| 6,048,953 | A * | 4/2000 | Kawashima et al. | 526/318.4 |
| 6,231,929 | B1 | 5/2001 | Milbourn et al. | |
| 6,303,190 | B1 | 10/2001 | Linert et al. | |
| 6,353,051 | B1 | 3/2002 | Huang | |
| 6,632,872 | B1 | 10/2003 | Pellerite et al. | |
| 2005/0003163 | A1 * | 1/2005 | Krishnan | 428/190 |
| 2006/0063871 | A1 | 3/2006 | Taylor et al. | |

FOREIGN PATENT DOCUMENTS

| | | | |
|---|---|---|---|
| JP | 11-80273 A | * | 3/1999 |
| JP | 2000-256612 A | * | 9/2000 |
| WO | WO96/16630 | | 6/1996 |
| WO | WO 2005/049757 | | 6/2005 |
| WO | WO 2007/033736 A1 | | 3/2007 |

OTHER PUBLICATIONS

Roosjen, A., et al., "Inhibition of adhesion of yeasts and bacteria by poly(ethylene oxide)- brushes on glass in a parallel plate flow chamber", *Microbiology*, vol. 149, p. 3239-3246 (2003).

Roosjen, A., et al., "Microbial Adhesion to Poly(ethylene oxide) Brushes: Influence of Polymer Chain Length and Temperature", *Langmuir*, vol. 20, p. 10949-10955 (2004).

Roosjen, A., et al., "Influence of shear on microbial adhesion to PEO-brushes and glass by convective-diffusion and sedimentation in a parallel plate flow chamber", *Coll, and Surf. B: Biointerfaces*, vol. 46, pp. 1-6 (2005).

Wei, J., et al., "Stainless steel modified with poly(ethylene glycol) can prevent protein adhesion but not bacterial adhesion", *Coll. And Surf., B: Biointerfaces*, vol. 32, p. 275-291 (2003).

Gabriel, S., et al., "Electrografting of Poly(ethylene glycol) Acrylate: A One-Step Strategy for the Synthesis of Protein-Repellent Surfaces", *Angew, Chem. Int. Ed.*, vol. 44, pp. 5505-5509, (2005).

Jeon, S., et al., "The Steric Repulsion Properties of Polyethylene Oxide", *Bull. Korean Chem. Soc.*, vol. 13, No. 3, pp. 245-248, (1992).

Kingshott, P., et al., "Covalent Attachment of Poly(ethylene glycol) to Surfaces, Critical for Reducing Bacterial Adhesion", *Langmuir*, vol. 19, pp. 6912-6921, (2003).

Krishnan, S., et al., "Comparison of the Fouling Release Properties of Hydrophobic Fluorinated and Hydrophilic PEGylated Block Copolymer Surfaces: Attachment Strength of the Diatom Navicula and the Green Alga Ulva", *Biomacromolecules*, vol. 7, pp. 1449-1462, (2006).

Lee, J.H., et al., "Surface properties of copolymers of alkyl methacrylates with methoxy (polyethylene oxide) methacrylates and their application as protein-resistant coatings", *Biomaterials*, vol. 11, pp. 455-464, (1990).

Nnebe, I., M., et al., "Direct force measurement of the stability of poly(ethylene glycol)-polyethylenimine graft films", *J. of Colloid and Interface Science*, vol. 276 pp. 306-316 (2004).

Razatos, A., et al., "Force Measurements between Bacteria and Poly-(ethylene glycol)-Coated Surfaces", *Langmuir*, vol. 16, pp. 9155-9158 (2000).

Roosjen, A., et al., "Stability and Effectiveness against Bacterial Adhesion of Poly(ethylene oxide) Coatings in Biological Fluids", Published online Feb. 25, 2005 in Wiley InterScience (www.interscience.wiley.com) DOI: 10,1002/jhm.b.30227.

* cited by examiner

POLYMER DERIVED FROM MONOMERS WITH LONG-CHAIN ALIPHATIC, POLY(OXYALKYLENE) AND SUBSTRATE-REACTIVE GROUPS

BACKGROUND

A biofilm is a conglomerate of microorganisms embedded in a highly hydrated matrix of exopolymers, typically polysaccharides, and other macromolecules. Biofilms may contain either single or multiple microbial species and readily adhere to such diverse substrates as medical appliances (including catheters), soil, pipelines, teeth, mucous membranes, and heat exchangers. In certain environments, the colonizing microorganism is capable of growing in both biofilm (sessile) and free-living (planktonic) form, and the biofilm-associated cells may outnumber planktonic cells of the same species by a ratio of 1000-10,000:1. Although growth of the planktonic cells can be controlled by antimicrobials or sterilization treatment, the biofilm itself may be refractory to treatment, providing, in effect, a reservoir of cells, which can lead to recurrence of colonization, infection, and/or biofilm growth after treatment.

Prevention of colonization by microorganisms and eradication of biofilm-associated microorganisms is an important, and often difficult to solve, problem in many diverse fields. Unlike planktonic organisms, which are relatively susceptible to biocides, e.g. antibiotics, biofilm-associated microorganisms are often highly resistant to many antimicrobials. In one study, biofilm-associated bacteria were able to survive a concentration of antibiotic 20 times the concentration effective to eliminate the same species of bacteria grown in planktonic culture (Nickel, 1985). It is known that when organisms are isolated from biofilms and then grown in planktonic culture, they lose many of the characteristics associated with the biofilm progenitors, in particular, their resistance to antimicrobial treatment. In the biofilm, the glycocalyx matrix is one protective mechanism that provides a barrier against host defense mechanisms, such as antibodies and phagocytes, as well as from certain antimicrobial agents. Other possible reasons for the antimicrobial resistance of biofilms include the quiescent growth state of many of the microorganisms, substantially altered gene and protein expression profiles (as compared to planktonic cells), and the presence of "persisters"; subpopulations of microorganisms conferred with antimicrobial resistance in a stochastic manner.

Although many compositions are known in the art for treating substrates to render them resistant to biofilm formation, there continues to be a desire to provide further improved compositions for the treatment of substrates, in particular polymer surfaces, ceramics, glass and stone, in order to render them further biofilm resistant, and easier to clean.

SUMMARY

The present invention provides a curable composition for use in retarding the formation of biofilms, or enhancing the release of formed biofilms. The curable composition comprises:

a) a polymer derived from ethylenically unsaturated monomer units having pendent long-chain aliphatic groups; ethylenically unsaturated monomer units having pendent poly (oxyalkylene) groups; and ethylenically unsaturated monomer units having pendent substrate-reactive groups; and b) a crosslinking agent.

In another embodiment, the invention comprises a coating composition comprising the curable composition and a solvent, whereby the coating compositions are applied to substrates to impart a biofilm-resistant coating thereto. In another embodiment, the invention further provides a method for coating a substrate, particularly a hard substrate, with the instant coating composition to provide a biofilm-resistant coating thereto. A wide variety of coating methods can be used to apply a composition of the present invention, such as brushing, spraying, dipping, rolling, spreading, and the like. The obtained coating on the substrate may be cured at room temperature or at an elevated temperature of 40 to 300° C. In some embodiments the curing may be effected by a catalyst, at room or elevated temperatures.

As used herein the term "(meth)acryloyl" includes both acryloyl and methacryloyl groups/compounds including esters, thioesters and amides of acrylic and methacrylic acid. In at least some embodiments, acrylate groups are preferred.

By "ethylenically unsaturated" it is meant a compound or component having free-radically polymerizable C═C group, such as a vinyl or a (meth)acryloyl group.

The recitation herein of numerical ranges by endpoints includes all numbers subsumed within that range (e.g., 1 to 5 includes 1, 1.5, 2, 2.75, 3, 3.80, 4 and 5). As used in this specification and the appended claims, the singular forms "a", "an", and "the" also include the plural forms unless the context clearly dictates otherwise. Thus, for example, reference to a composition containing "a compound" includes a mixture of two or more compounds. In addition, the term "or" is generally used in the sense of "and/or" unless the context clearly dictates otherwise.

Unless otherwise indicated, all numbers expressing quantities of ingredients, measurement of properties such as surface energy, contact angles, and so forth used in the instant specification and claims are to be understood as being modified in all instances by the term "about." Accordingly, unless indicated to the contrary, the numerical parameters set forth in the specification and attached claims are approximations that can vary depending upon the desired properties sought by those skilled in the art utilizing the teachings of the present invention. At the very least, and not as an attempt to limit the application of the doctrine of equivalents to the scope of the claims, each numerical parameter should at least be construed in light of the number of reported significant digits by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors and uncertainties necessarily resulting from the standard deviations found in their respective testing measurements.

DETAILED DESCRIPTION

Figure 1:
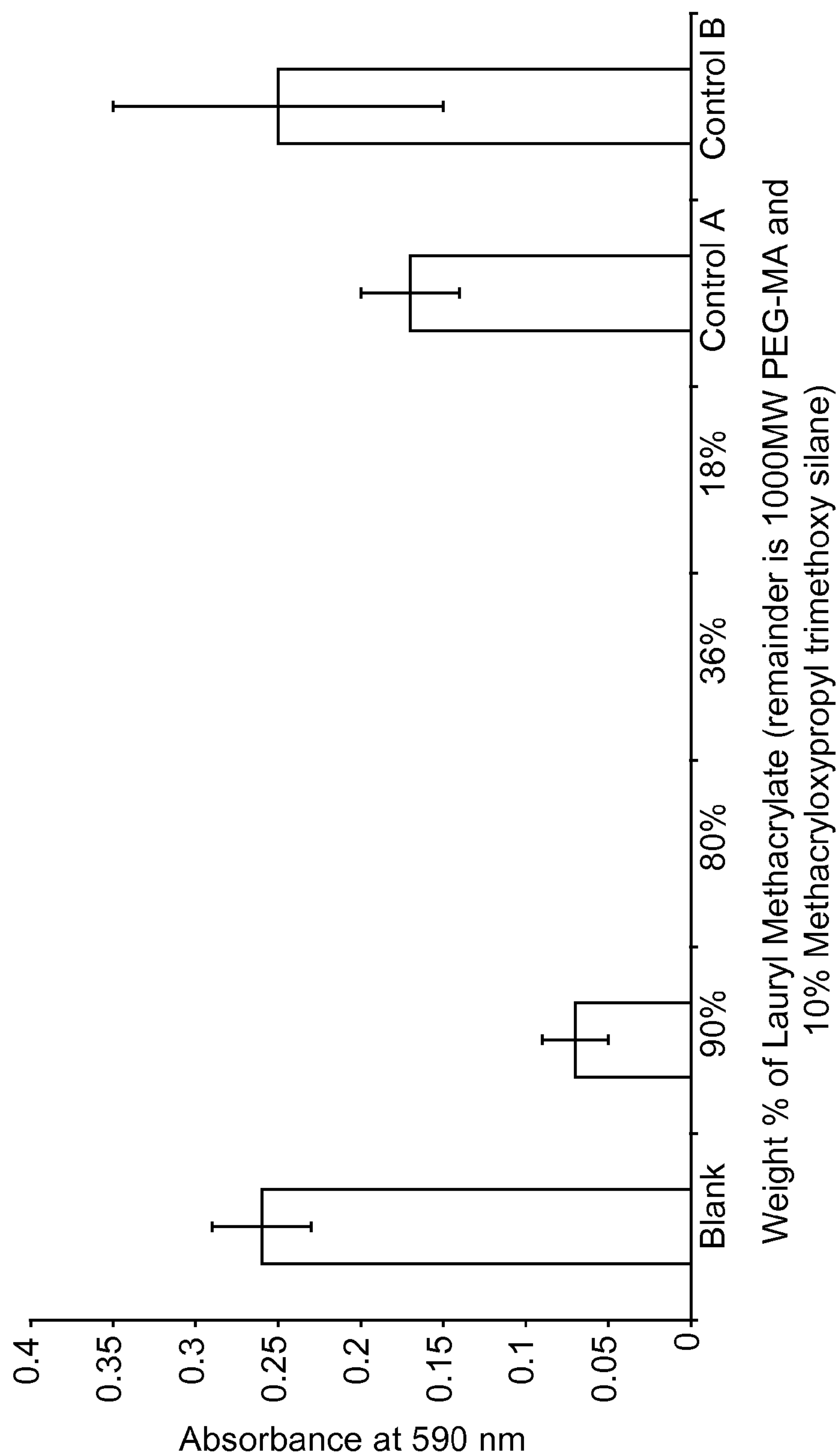
FIG. 1 shows data for the retention of biofilms on coated surfaces using lauryl methacrylate as the alkyl chain-bearing monomer. The bacterium used in the test is *Aeromonas hydrophilia.*

The present invention provides a curable composition comprising:

a) a polymer derived from ethylenically unsaturated monomer units having pendent long-chain aliphatic groups; ethylenically unsaturated monomer units having pendent poly(oxyalkylene) groups; and ethylenically unsaturated monomer units having pendent substrate reactive groups; and b) a crosslinking agent.

More specifically the first component polymer of the present invention comprises 10 to 70 wt. %, preferably 15 to 40 wt. %, of ethylenically unsaturated units having pendent long chain aliphatic groups;

10 to 80 wt. %, preferably 40 to 75 wt. %, of ethylenically unsaturated units having pendent poly(oxyalkylene) groups;

1-20 wt. %, preferably 5 to 15 wt. %, of ethylenically unsaturated units having pendent [substrate reactive] groups; and 0 to 20 wt. %, preferably 0 to 10 wt. % of other monomers, The "substrate-reactive functional groups" are chosen so that they form an ionic or covalent bond with the functional groups at a selected substrate surface. Preferably the "substrate-reactive functional groups" are chosen so that the bond formed with the substrate is non-hydrolysable; i.e. does not substantially hydrolyze under conditions of use. Such limits will not preclude the use of silane functional groups in which the siloxane bond formed with siliceous substrate surfaces is thought to continuously hydrolyze and reform.

The crosslinking agent is further selected to have functional groups that are co-reactive with the pendent substrate-reactive functional groups of the first component polymer, i.e. form a covalent bond therewith. The optional "other monomers" are lacking in reactive functional groups and are added to modify the physical properties of the first component polymer.

The monomer having a long chain aliphatic group is of the general formula $$R^1\text{-}Q\text{-}R_h, \quad \text{(I)}$$

wherein $R^1$ is a ethylenically unsaturated polymerizable group of the general formula: $H_2C{=}C(R^{11})$—, wherein $R^3$ is H or $C_1$-$C_4$ alkyl, preferably $R^{11}$ is H or methyl.

Q is an organic linking group, which can include linear, branched, or cyclic structures that may be saturated or unsaturated. Preferably, each divalent Q group is independently a linear group that optional includes heteroatoms and/or functional groups. Examples include a divalent alkylene group, arylene group, or mixture thereof, substituted with one or more heteroatoms (e.g., oxygen, nitrogen, or sulfur), functional groups (e.g., carbonyl, amido, or sulfonamido), or both, containing about 2 to about 16 carbon atoms (preferably, about 3 to about carbon atoms).

Examples of Q include the following, wherein each r is independently an integer from 1 to about 10, and $R^5$ is hydrogen, aryl, or alkyl of 1 to about 4 carbon atoms. Thus depicted structures are non-directional.

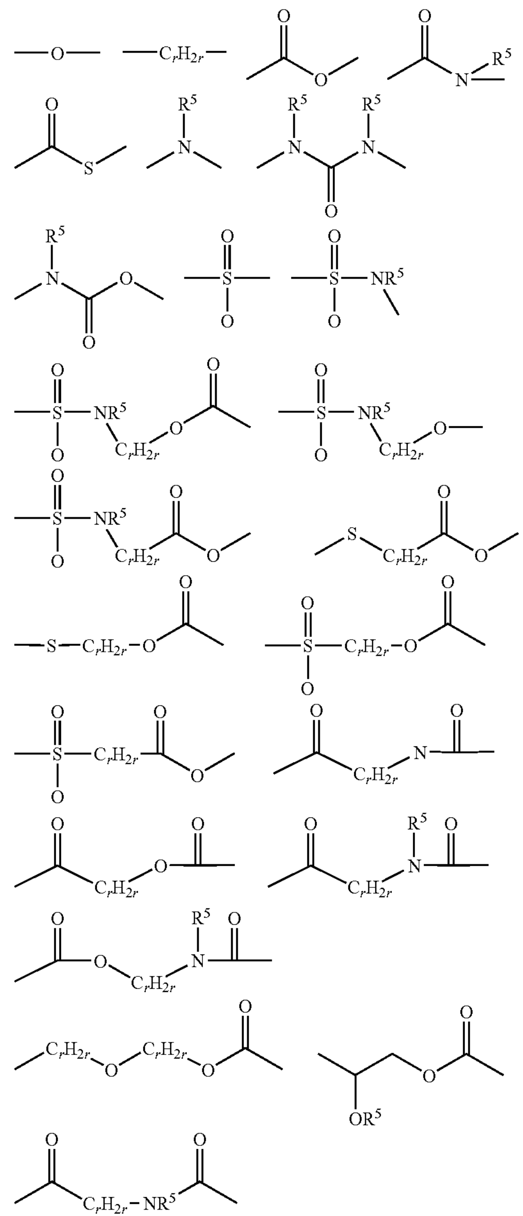

It will be understood with respect to the $R^1$ and Q groups, that taken together $R^1$-Q may comprise vinyl, allyl, vinyloxy, allyloxy, and (meth)acryloyl groups. Preferably, $R^1$-Q comprises a (meth)acryloyl group.

$R_h$ is a long-chain aliphatic group; i.e. a monovalent, linear or branched chain, saturated, cyclic or acyclic (or any combination thereof) aliphatic group having from 8 to 75 carbon atoms, preferably 10 to 50, more preferably 10 to 24. Preferably $R_h$ is a linear, monovalent alkyl group of the structure —$C_nH_{2n+1}$ where n is 8 to 75, preferably 10 to 24 carbon atoms. Compounds of Formula I may be selected from long chain alkyl(meth)acrylate esters, and thioesters, long chain alkyl vinyl ethers, long chain vinyl esters and long chain alkyl(meth)acrylamides.

The monomer component of the instant curable composition comprises one or more monofunctional poly(alkylene oxide) monomers. The monomers comprise one terminal polymerizable ethylenically unsaturated group (e.g., only one (meth)acryloyl group, vinyl group, allyl group or allyloxy group), a poly(alkylene oxide) moiety (such as previously described) and a second, non-free radically polymerizable, terminal end group such as OH, ($C_1$-$C_4$) alkoxy, aryloxy (e.g., phenoxy), or ($C_1$-$C_4$) alkaryloxy groups. These groups can be linear or branched.

The poly(alkylene oxide) moiety is of the general formula —$(CH(R^2)—CH_2—O—)_m—(CH_2—CH_2—O—)_n$—, wherein m may be 0, is at least 5 and the mole ratio of n to m (n:m) is greater than 2:1, preferably greater than 3:1; and $R^2$ is a ($C_1$-$C_4$) alkyl group. The structural distribution of —CH($R^2$)—$CH_2$—O— moieties and —$CH_2$—$CH_2$—O— moieties may be random or blocks. Preferably m+n is at least 5, and more preferably at least 20. Preferably m+n is less than 500, and more preferably less than 150. It will be understood that m and n may be non-integral, as the poly(alkylene oxide) moieties are generally a mixture of varying amounts or populations of the m and n units.

Preferred monofunctional poly(alkylene oxide) monomers are of the formula:

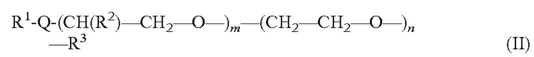

$$R^1\text{-Q-}(CH(R^2)—CH_2—O—)_m—(CH_2—CH_2—O—)_n—R^3 \quad \text{(II)}$$

wherein $R^1$ is a ethylenically unsaturated polymerizable group, as previously described for Formula I, $R^2$ is a ($C_1$-$C_4$) alkyl group, $R^3$ is H or $R^2$ or an aryl group or combination thereof, Q is a divalent linking group, such as previously described for Formula I, n is at least 5, m may be 0, n+m is at least 5 and preferably at least 20, and the mole ratio of n:m is at least 2:1 (preferably at least 3:1).

Examples of suitable monofunctional poly(alkylene oxide) monomers include poly(ethylene oxide)(meth)acrylate, poly(ethylene oxide-propylene oxide)(meth)acrylate, and combinations thereof. Such monomers typically include nonreactive end groups (to free-radically polymerizations) such as ($C_1$-$C_4$) alkyl, aryl (e.g., phenyl), ($C_1$-$C_4$) alkaryl, aryl($C_1$-$C_4$), or hydroxy groups. These groups can be linear or branched. These monomers can be of a wide range of molecular weights and are commercially available from sources such as Sartomer Company, Exton, Pa.; Shinnakamura Chemical Co., Ltd., Tokyo, Japan; Aldrich, Milwaukee, Wis.; and Osaka Organic Chemical Ind., Ltd., Osaka, Japan.

The functional monomer is a compound of the structure $R^1$-Q-X (III) wherein: $R^1$-Q- is a ethylenically unsaturated polymerizable group, including vinyl, allyl, vinyloxy, allyloxy, (meth)acrylamido and (meth)acryloyl, as previously described for Formula I, Q is a divalent linking group, such as previously described for Formula I, and X is a surface-reactive functional group that is capable of bonding with a substrate (e.g., the metal surface, glass, glass cloth, or any surface to which X may form a covalent or ionic bond therewith) on which the curable composition is disposed, and further is capable of bonding with the crosslinking agent.

Preferably, X is a thiol group (—SH), a monophosphate group, a phosphonate or phosphonic acid group (—P(O)$(OH)_2$), a hydroxamic acid group (—C(O)NHOH), a carboxylic acid group (—C(O)OH), an isonitrile group, an isocyanate group, an amine group, a silyl group, or a disulfide group (—S—S—). More preferably, X is a thiol group, a monophosphate group, a phosphonate group, a carboxylic acid group, a silyl group, a titanate group or a zirconate group.

For aluminum oxide surfaces, preferably X includes a phosphonic acid group (—P(O)$(OH)_2$), a hydroxamic acid group (—C(O)NHOH), or a carboxylic acid group (—C(O)OH). For iron oxide or steel surfaces, preferably X includes a hydroxamic acid group (—C(O)NHOH). For copper oxide, preferably X includes a hydroxamic acid group (—C(O)NHOH), a thiol group (—SH), a monophosphate group, a phosphonate or phosphonic acid group.

For silicon oxide, glass, or other siliceous surfaces, preferably X includes a silyl group of the formula $—Si(Y)_x(R^7)_{3-x}$, wherein Y is a hydrolysable group (including a halogen, a $C_1$-$C_4$ alkoxy group, or a $C_1$-$C_4$ acyloxy group), and $R^7$ is a monovalent alkyl or aryl group, x is 1, 2 or 3. For gold, copper, and silver, preferably X is a thiol group (—SH) or a disulfide group (—S—S—).

Many polymer substrates such as polyurethanes have hydroxyl groups or carboxylic acid groups on their surface, and X may be chosen accordingly. If a polymer surface does not contain functional groups, then such functional groups can be created on the surface by means known in the art. For example, corona discharge in oxygen containing atmospheres will create hydroxyl and carboxyl groups on a surface. Plasma treatment will impart any of a number of reactive groups on the polymer surface. The pendent substrate-reactive group "X" can then be chosen to be reactive with that surface reactive group.

The first component polymers may further comprise other monomers, not previously described. The selection of the "other monomers" useful in preparing the polymer is such that the ultimate crosslinked material has properties suitable for its application. For example, "other monomers" may be used to increase the tensile strength or other mechanical properties, or to control the $T_g$ of the polymer. Representative examples of "other monomers" include free-radically polymerizable monomers having at least one ethylenically unsaturated polymerizable group that are copolymerizable with the aforementioned monomers, and include vinyl monomers such as vinyl acetate, styrenes, allyl ethers, maleic anhydride, alkyl vinyl ethers, "polar monomers" and lower alkyl (meth)acrylates. Where present, the polymer generally comprises less than 20 wt. %, e.g. 1 to 10 wt. % of such monomer units.

Alkyl (meth)acrylate ester monomers useful in the invention include straight-chain, cyclic, and branched-chain isomers of alkyl esters containing $C_1$-$C_7$ alkyl groups. Useful specific examples of alkyl(meth)acrylate esters include: methyl(meth)acrylate, ethyl(meth)acrylate, n-propyl(meth)acrylate, 2-butyl(meth)acrylate, iso-amyl(meth)acrylate, n-hexyl(meth)acrylate, and heptyl(meth)acrylate.

The first component polymer may further comprise "polar monomers". As used herein "polar monomers" are those polymerizable monomers having a water miscibility (water in monomer) of at least 1 wt. %, preferably at least 5 weight % without reaching a cloud point. Polar monomers can be used to increase the absorbency and/or improve the mechanical properties (e.g. the tensile strength) of the cured composition. Preferred polar monomers can also provide compliance to the resultant polymer. The polar monomer may contain functional groups, but such functional groups are generally nonreactive with the selected substrate, the surface-reactive monomer or the crosslinking agent.

Examples of suitable polar monomers include, N-vinyl caprolactam, N-vinyl acetamide, N-vinyl pyrrolidone, acrylonitrile, tetrahydrofurfuryl acrylate, acrylamide, mono- or di-N-alkyl substituted acrylamide, beta-carboxyethyl acrylate, [2-(meth)(acryloyloxy)ethyl]trimethylammonium chloride, [2-(meth)(acryloyloxy)ethyl]trimethylammonium methyl sulfate, [2-(meth)(acryloyloxy)ethyl]dimethyloctadecylammonium chloride and combinations thereof. Preferred polar monomers include N-vinyl pyrrolidone, N-vinyl acetamide, and monomers that are also quaternary ammonium salts and mixtures thereof, and the like. Useful quaternary ammonium-containing polar monomers are disclosed in U.S. Pat. Nos. 5,374,501 and 5,712,027 (Ali et al.), incorporated herein by reference.

The polymer component may be produced by polymerizing the above-described monomer components by conventional polymerization methods. Typical polymerization methods that can be used include thermal and/or photochemical as well as bulk and solution polymerization. Molecular weight may be controlled through the use of chain transfer agents and chain retarding agents, as are known in the art, such as alkyl mercaptans such as dodecyl mercaptan, isooctyl thioglycolate, and alpha-methylstyrene.

In a typical solution polymerization method, the monomer components are combined, optionally heated, with stirring in the presence of a solvent and a polymerization initiator. Examples of solvents are methanol, ethanol, isopropanol, acetone, methyl ethyl ketone, methyl iso-butyl ketone, methyl acetate, ethyl acetate, heptane, toluene, xylene, and ethylene glycol alkyl ethers. Those solvents can be used alone or as mixtures thereof. Preferably, where the substrate reactive functional group X is a silane, the solvent component contains an alcohol solvent capable of forming a solution with all the monomers.

Suitable initiators for this polymerization reaction include, for example, thermal and photo initiators. The initiator is typically used at a level of 0.001 to 5 parts by weight per 100 parts by weight monomer(s). Useful thermal initiators include azo compounds and peroxides. Examples of useful azo compounds include 2,2'-azobis(2,4-dimethylpentanenitrile), (Vazo™ 52, commercially available from E. I. duPont de Nemours & Co.); 2,2'-azobis(isobutyronitrile), (Vazo™ 64, commercially available from E. I. duPont de Nemours & Co.); 2,2'-azobis(2-methylbutyronitrile), (Vazo™ 67; commercially available duPont); 1,1'-azobis(cyanocyclohexane), (Vazo™ 88; commercially available from duPont.); 1,1'-azobis(1-cyclohexane-1-carbonitrile), (V-40, commercially available from Wako Pure Chemical Industries, Ltd.); and dimethyl 2,2'-azobis(isobutyrate), (V-601™, commercially available from Wako). Examples of useful peroxides include benzoyl peroxide; di-t-amyl peroxide, t-butyl peroxy benzoate, 2,5-dimethyl-2,5di-(t-butylperoxy)hexane, 2,5-dimethyl-2,5-di-(t-butylperoxy)hexyne-3; lauroyl peroxide, and t-butyl peroxy pivalate. Useful organic hydroperoxides include but are not limited to compounds such as t-amyl hydroperoxide and t-butyl hydroperoxide.

Useful photoinitiators include benzoin ethers such as benzoin methyl ether and benzoin butyl ether; acetophenone derivatives such as 2,2-dimethoxy-2-phenyl-acetophenone and 2,2-diethoxy acetophenone; and acylphosphine oxide derivatives and acylphosphonate derivatives such as diphenyl-2,4,6-trimethylbenzoylphosphine oxide, isopropoxy (phenyl)-2,4,6-trimethylbenzoylphosphine oxide, and dimethyl pivaloylphosphonate. Of these, 2,2-dimethoxy-2-phenyl-acetophenone is preferred.

In a typical photopolymerization method, a mixture of the monomer component is irradiated with ultraviolet (UV) rays in the presence of a photopolymerization initiator (i.e., photoinitiators). Commercially available photoinitiators include IRGACURE from Ciba Speciality Chemical Corp., Tarrytown, N.Y. and include 1-hydroxy cyclohexyl phenyl ketone (IRGACURE 184), 2,2-dimethoxy-1,2-diphenylethan-1-one (IRGACURE 651), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl) butanone (IRGACURE 369), 2-methyl-1-[4-(methylthio) phenyl]-2-morpholinopropan-1-one (IRGACURE 907), and 2-hydroxy-2-methyl-1-phenyl propan-1-one (IRGACURE 1173). Particularly preferred photoinitiators are IRGACURE 819 and 2959.

Chain transfer agents may be used when polymerizing the monomers described herein to control the molecular weight of the resulting polymer. Suitable chain transfer agents include halogenated hydrocarbons (e.g., carbon tetrabromide) and sulfur compounds (e.g., lauryl mercaptan, butyl mercaptan, ethanethiol, and 2-mercaptoethyl ether, isooctyl thioglycolate, t-dodecylmercaptan, 3-mercapto-1,2-propanediol). When a siliceous surface is the substrate of choice, a preferred chain transfer agent is mercaptopropyl trimethoxysilane. The amount of chain transfer agent depends upon the desired molecular weight of the polymer and the type of chain transfer agent. The chain transfer agent is typically used in amounts from about 0.1 parts to about 10 parts; preferably 0.1 to about 8 parts; and more preferably from about 0.5 parts to about 6 parts based on total weight of the monomers.

The curable composition further comprises a crosslinking agent of the formula $R^8(Z)_m$ where $R^8$ may be a polymeric or non-polymeric organic group that has a valence of m, and Z is a reactive functional group that is co-reactive with the functional groups of the functional monomer. With respect to the compound $R^8(Z)_m$, m is at least two. The multiple -Z groups of the polyfunctional compound may be the same or different.

It will be understood in the context of the above description of the first component polymer and the crosslinking component, that the ethylenically-unsaturated monomer possessing a reactive functional group (the "X" group of the monomer of Formula III) is chosen such that the first component polymer and the crosslinking component are mutually co-reactive so that the first component polymer has a pendant functional group (the "X" group" that is co-reactive with the pendant functional group of the second component crosslinking agent (the "Z" group). The reactive and co-reactive functional groups form a crosslink between the first and second components by forming a linking group between the electrophilic and nucleophilic functional group pairs, and may include reactions commonly referred to as displacement, condensation and addition reactions, rather than polymerization of ethylenically-unsaturated groups.

Exemplary combinations include hydroxyl or amino functional groups reacting with silane-, isocyanate-, and anhydride-functional groups, and carboxyl groups reacting with aziridine or epoxy groups. Epoxy resins can be chosen to be reactive with phosphates and phosphonates. Mercapto functional monomers can be reacted with isocyanates and epoxy groups. Where a siliceous surface is selected, both X and Z are preferably silane groups of the formula $—Si(Y)_x(R^7)_{3-x}$, wherein Y is a hydrolysable group (including a halogen, a $C_1$-$C_4$ alkoxy group, or a $C_1$-$C_4$ acyloxy group), and $R^7$ is a monovalent alkyl or aryl group, x is 1, 2 or 3.

The organic moiety $R^8$ has a molecular weight up to 20,000, preferably selected from mono- and polyvalent hydrocarbyl (i.e., aliphatic and aryl compounds having 1 to 30 carbon atoms and optionally zero to four catenary heteroatoms of oxygen, nitrogen or sulfur), polyolefin, polyoxyalkylene, polyester, polyolefin, polyacrylate, or polysiloxane backbones and is soluble in the coating solvent.

In one embodiment, $R^8$ comprises a non-polymeric aliphatic, cycloaliphatic, aromatic or alkyl-substituted aromatic moiety having from 1 to 30 carbon atoms. In another embodiment, $R^8$ comprises a polyoxyalkylene, polyester, polyolefin, polyacrylate, or polysiloxane polymer having pendent or terminal reactive -Z groups. Useful polymers include, for example, hydroxyl, thiol or amino terminated polyethylenes or polypropylenes, hydroxyl, thiol or amino terminated poly (alkylene oxides) and polyacrylates having pendant reactive functional groups, such as hydroxyethyl acrylate polymers and copolymers.

Useful alcohols of the formula $R^8(Z)_m$ include aliphatic and aromatic polyols. The polyols useful in the present invention include aliphatic or aromatic polyols having 1 to 30 carbon atoms, at least two hydroxyl groups. Example of useful polyols include ethylene glycol, propylene glycol, butanediol, 1,3-pentane diol, 2,2-oxydiethanol hexanediol poly (pentyleneadipate glycol), poly(tetramethylene ether glycol), poly(ethylene glycol), poly(caprolactone diol), poly(1,2-butylene oxide glycol), trimethylyol ethane, trimethylol propane, trimethyol aminomethane, ethylene glycol, 2-butene-1,4-diol, pentaerythritol, dipentaerythritol, and tripentaerythritol. The term "polyol" also includes derivatives of the above-described polyols such as the reaction product of the polyol with di- or poly-isocyanate, or di- or poly-carboxylic acid, the molar ratio of polyol to —NCO, or —COOH being 1 to 1.

Useful amines of the formula $R^8(Z)_m$ include aliphatic and aromatic polyamines. Representative useful di- or polyamines are 4,4'-methylene dianiline, 3,9-bis(3-aminopropyl)-2,4,8,10-tetraoxaspiro[5,5]undecane, and polyoxyethylenediamine. Many di- and polyamines, such as those just named, are available commercially, for example, those available from Huntsman Chemical, Houston, Tex. The most preferred di- or polyamines include aliphatic diamines or aliphatic di- or polyamines and more specifically compounds with two primary amino groups, such as ethylene diamine, hexamethylene diamine, dodecanediamine, and the like.

Useful thiols of the formula $R^8(Z)_m$ include aliphatic and polyfunctional thiols Useful alkyl thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, 2-amino-3-mercaptopropionic acid, and pentaerythritol tetrathioglycolate. Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

Suitable polyisocyanates include organic compounds containing at least two free isocyanate groups. Diisocyanates of the formula $R^9(NCO)_2$ are preferably used wherein $R^9$ denotes an aliphatic hydrocarbon group with 4 to 20 carbon atoms, a cycloaliphatic hydrocarbon group with 6 to 20 carbon atoms, an aromatic hydrocarbon group with 6 to 20 carbon atoms or an araliphatic hydrocarbon group with 7 to 20 carbon atoms.

Examples of diisocyanates include tetramethylene diisocyanate, hexamethylenediisocyanate (HDI), dodecamethylenediisocyanate, 1,4-diisocyanatocy clohexane, 1-isocyanato-3,3,5-trimethyl-5-isocyanatomethylcyclohexane (IPDI), 4,4' diisocyanato-dicyclohexylmethane (1-112 MDI), 4,4'-diisocyanato-2,2-dicyclohexyl-propane, 1,4-diisocyanatobenzene, 2,4-diisocyanatotoluene (TDI), 2,6 diisocyanatotoluene, 4,4'-diisocyanatodiphenylmethane (MDI), m- and p xylylenediisocyanate, α, α, α', α'-tetramethyl-m- and p-xylylenediisocyanate and mixtures of these compounds. Suitable polyisocyanates also include triisocyanates such as 1,3,5 triisocyanatocyclohexane-s-trione, isocyanurate and biuret derivatives of HDI and H12 MDI as well as polymeric aromatic isocyanates such as PAPI™ materials from Dow Chemical, Midland, Mich.

For siliceous substrates, a compound having at least two free silyl groups is preferred. Suitable silane crosslinking agents generally have the formula $R^{10}(-Si(Y)_x(R^7)_{3-x})_p$, wherein Y is a hydrolysable group (including a halogen, a $C_1$-$C_4$ alkoxy group, or a $C_1$-$C_4$ acyloxy group), and $R^7$ is a monovalent alkyl or aryl group, x is 1, 2 or 3, p is at least 2 and $R^{10}$ is a polyvalent organic group, preferably a divalent alkylene group of 3 to 10 carbon atoms, optionally substituted by catenary oxygen or nitrogen atoms.

Silane crosslinking agents falling within this category are commercially available, e.g., from Silar Laboratories of Scotia, N.Y., Allied-Signal, Inc. of Morristown, N.J., and from OSI Chemicals of Lisle, Ill. An alkoxysilane bearing a secondary amino group, for example, bis-(trimethoxysilypropyl)amine (Silquest $A\text{-}_{1170}$ from Osi Specialties, Inc., Lisle, Ill.) is particularly preferred as amine-containing silanes are self-catalyzing.

The extant polymer may be combined with the crosslinking agent, and the composition crosslinked by thermal means, optionally in the presence of a catalyst to effect the condensation reaction. The choice of a particular catalyst is dependent on the functional group(s) of $R^8(Z)_m$, and the substrate-reactive function group X of Formula III. The catalysts can be acid catalysts, base catalysts, or metal-containing catalysts. Generally, the catalyst, or mixture of catalysts, is present in the composition in an amount of about 0.01-5 wt-%, and more preferably in an amount of about 0.1-2 wt-%, based on the total weight of the curable composition.

Where the first polymer and/or the crosslinking agent have silane functional groups (Formula II, X is a silane), suitable curing catalysts for silane functional groups include alkyl tin compound (e.g., dibutyltindilaurate, dibutyltindiacetate, and dibutyltindioctoate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). In general, however, it is preferred to select silane crosslinking agents that do not require the use of curing catalysts to avoid reducing shelf-life and adversely affecting the physical properties of the coating composition.

Other catalysts useful for silane functional groups include acids, anhydrides, and lower alkyl ammonium salts thereof which include but are not limited to trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

The coating compositions of the invention may include an effective amount of biocide to prevent or retard the growth of microorganisms. The invention is not to be limited to the selection of any particular biocide, and any known biocide may be included in the compositions of the invention such as mildewcides, antimicrobials, antiseptics, disinfectants, sanitizers, germicides, algicides, antifouling agents, preservatives, combinations of the foregoing and the like. It is intended within the broad teachings of the invention that the biocide will be selected as needed to protect a particular substrate against a particular type of microbial growth under conditions of humidity or exposure to varying degrees of moisture. Moreover, the biocide included within the compositions of the invention can comprise one or more biocidally effective substances.

The selected biocide or combination of biocides will be compatible with the other components of the composition, and preferably is one which is effective against common microorganisms such as those normally found in humid, moist or wet environments, for example. The selection of a suitable biocide for inclusion within the compositions of the invention is believed to be within the skill of those practicing in the field. With the requirement that the biocide is chemically compatible with the other components in the composition, suitable classes of biocides include cationic quaternary ammonium compounds, organosulfur compounds such as sulfones and thiocyanates; isothiazolones; phenols and substituted phenols; diazines; triazines, organotin compounds; amides such as 2,2-dibromo-3-nitrilopropionamide and iodobenzanilide; carbamates including but no limited to, thiocarbamates, benzimidazolyl carbamates and dithiocarbamates; hydantoins including dimethylhydantoins; organohalogens; carbinols such as dichlorophenyl trichloroethanol; organophosphates; ureas including benzoyl ureas such as difluoro benzoyl chlorophenylurea; pyrethrinoids; quinones; dicarboximides; guanidines such as dodecyl guanidine acetate; triazoles; thiadiazoles; and metallic monoethyl phosphates, silver, copper, tin and salts thereof, as well as effective combinations of any of the foregoing compounds.

The biocide may be present within the curable or cured compositions of the invention at a concentration ranging from about 0.1 to 5.0 wt. %, and preferably ranging from about 0.1 to 2.0 wt-%. Of course, the invention is not to be limited to the foregoing concentration ranges. The concentration of biocide can be adjusted as needed to maintain a desired level of effectiveness under varying conditions of expected use such as differing humidity levels, temperature conditions and the like. Additionally, the chemical nature of the chosen biocide may influence the desired concentration of biocide, as known by those skilled in the art.

The substrate on which the coating is disposed for the retardation of biofilms can be any of a wide variety of materials. Useful substrates include ceramics, siliceous substrates including glass, metal, natural and man-made stone, woven and nonwoven articles, polymeric materials, including thermoplastic and thermosets, (such as poly(meth)acrylate, polycarbonate, polystyrene, styrene copolymers, such as styrene acrylonitrile copolymers, polyesters, polyethylene terephthalate), silicones (such as that used in medical tubing), paints (such as those based on acrylic resins), powder coatings (such as polyurethane or hybrid powder coatings), and wood. Various articles can be effectively treated with the coating composition of the present invention to provide a biofilm-resistant coating thereon.

Many substrates that can be treated in a particularly effective way with the curable composition or coating composition of this invention include substrates having surface functional groups capable of reacting with the X group of the polymer according to Formula II. Preferably, such reactivity of the surface of the substrate is provided by active hydrogen atoms. When such active hydrogen atoms are not present, the substrate may first be treated in a plasma containing oxygen or in a corona atmosphere to make it reactive to the X group of Formula II.

If a polymer surface does not contain functional groups, then such functional groups can be created on the surface by any of a number of means. For example, corona discharge in oxygen containing atmospheres will create hydroxyl and carboxyl groups on a surface. Plasma treatment will impart any of a number of reactive groups on the polymer surface. The functional monomer can then be chosen to be reactive with that surface reactive group. The choice of surface treatment is, of course, heavily dependent on the polymeric material to be used as the substrate.

One method that has been found quite useful in the application of the coatings of the instant invention to polymeric materials is to oxidize the surface of the polymer surface by means of an oxygen plasma discharge. This is followed by the creation of a siliceous (glass or silica-like) surface. Silica surfaces can be generated by a variety of techniques. One useful method consists of applying a monomeric or oligomeric silane in alcohol solution to the surface followed by exposure to ammonia vapor. This tough, microporous glass-like surface is then amenable to reaction with the silane modified coatings of the invention, imparting durability to the coatings of the invention. Further reference may be had to WO 2005/049757 (Harvey et al.).

If the surface is a perfluorinated surface, such as a polytetrafluoroethylene (PTFE) polymer surface, it may be treated with sodium dissolved in ammonia or by sodium naphthenate dissolved in tetrahydrofuran or other appropriate solvent. This treatment defluorinates the surface and results in a surface with hydroxyl and carboxyl groups, which are then amenable to reaction with many of the functional groups described above.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

Metallic surfaces are often covered with layers of organic contaminants. Before the coatings of the invention can be applied to such surfaces, they should be cleaned by at least solvent wiping. In the case of gross contamination, the metallic surface may have to be etched, anodized or treated in ways known to those skilled in the art. For example, if the surface of steel is coated with rust, that rust may have to be etched away by an acid treatment. Once the surface of the metal is exposed, the coating can be applied, allowing the substrate-reactive functional group to react with the hydroxyl groups or metal atoms in the surface of the substrate.

Biofilms typically develop where the substrate is in contact with water or exposed to humid conditions. The curable coatings retard the formation of such biofilms, particularly when exposed to circulating water. It is believed that the microorganisms are unable or minimally able to attach to the coated surfaces. Further, it is believed that extant biofilms are more easily removed from the coated surface. Thus, the curable composition is particularly suited for substrates in wet or humid environments such as in medical catheter coatings, antifouling marine coatings, coatings for water handling equipment, heat exchangers and other HVAC equipment, coatings for filter media, and dental equipment, devices and materials that may be used in the oral cavity.

The coating composition comprises the first component polymer, the crosslinking component and a solvent. Useful solvents include any that do not deleteriously affect either bonding with the substrate or the crosslinking reaction and in which the components are soluble to at least 1% by weight. Examples of the solvent are methanol, ethanol, isopropanol, acetone, methyl ethyl ketone, methyl iso-butyl ketone, methyl acetate, ethyl acetate, heptane, toluene, xylene, and ethylene glycol alkyl ether. Those solvents can be used alone or as mixtures thereof. If the polymer contains pendent silane functional groups, preferably the solvent component contains an alcohol solvent which tends to temporarily retard the reaction between the silanes. Generally, aqueous solutions are not preferred as the polymer component is substantially insoluble in neutral water; characterized in that a mixture of greater than 0.1% by weight of the polymer in neutral (pH about 7) water results in a multiphase composition.

The coating composition is typically a relatively diluted solution, containing between 0.1 and 50 percent by weight of the solids components, preferably between 1 and 25 percent by weight of the solids components. The ratio of the solvents, the polymer and crosslinking components should be chosen so as to obtain a homogeneous mixture that has a viscosity appropriate to the application conditions. For example, a material to be brush or roller coated would likely be preferred to have a higher viscosity that a dip coating solution.

EXAMPLES

All solvents and reagents were obtained from Aldrich Chemical Company, Milwaukee, Wis., unless otherwise noted. All percents and amounts are by weight unless otherwise specified.

Polymerization Method

Copolymers of alkyl methacrylates, and poly(ethylene glycol) monomethacrylate monomethyl ether (PEG 1000, MW=~1000) were made by a method described below and specific components of the reaction mixture are listed in Table 1. Varying mixtures of toluene, heptane and ethanol were used to place polyethylene glycol monomethacrylate monomethyl ether and alkyl methacrylate monomers in solution. In addition to the monomers, the polymerization mixtures included 5-10% methacryloxypropyl tri(m)ethoxysilane and 0.5-1% mercaptopropyl trimethoxysilane. VAZO 64 was used as the polymerization initiator at a concentration of 0.5-1% based upon monomer weight. The monomers were dissolved in the solvent or solvent mixture. If the monomer was a solid, there was often the need to mildly heat the polymerization mixture to insure dissolution of all of the monomers. The temperature used to dissolve the monomers was 60° C. or less. The reaction mixture was then cooled to 20° C. before VAZO 64™ initiator was added. Nitrogen was then bubbled through the reaction mixture for two minutes and capped. The bottles were wrapped with electrical tape and placed in cages, with the bottles protected from breakage by sponges. The cages (with bottles inside) were placed in an Atlas Launder-o-meter (Atlas Electric Device Company, Chicago, Ill.) The polymerization was carried out at 65° C. for 18 hours and, afterwards, percent solids were determined.

Preparation of Surface with Coated Film

Biofilm resistant curable compositions were tested by coating on surface prepared polycarbonate disks. The polycarbonate disks were milled from a 0.5" polycarbonate rod (Plastics International, Eden Prairie, Minn.). The disks were nominally 0.15" thick and nominally 0.5" in diameter. The surfaces of these disks were abraded using 3M 500 grit Wetordry Tri-M-Ite and then polished using 3M Wetordry Polishing Paper. The substrates were plasma treated in oxygen using a YES G1000 plasma treater, (available from Yield Engineering Systems, San Jose, Calif.) at 500W for 10 minutes. Afterwards, a coating of poly(dimethoxysilane)(PSI-026, available from Gelest, Inc., Morrisville, Pa.) at about 1% solids in ethanol was applied using an eyedropper to the plasma treated surface. 1 or 2 drops of the PSI-026 solution was applied to each side of the polycarbonate disk. The solution completely wet the disk surface. The solvent was allowed to evaporate and when dry, the disks were placed in a dessicator whose bottom well was filled with a ammonium hydroxide for about ½ hour.

Curable composition coating mixtures were made in the solvent mixtures as listed in Table 2. In general, the coating solutions contained the copolymer being tested (1 to 2% solids) and A1170 (20% based on copolymer weight, bis (trimethoxysilylpropyl)amine, available from Gelest, Inc, Morrisville Pa.). The coated substrates were cured at 120° C. for 15 hours.

Testing of Coated Surfaces for Biofilm Resistance

The CDC biofilm reactor (Biosurface Technologies, Bozeman Mont.) was used to evaluate the ability of the prepared curable compositions to resist biofilm formation. This system allowed quantification of macroscopic biofilm formation on multiple test substrate samples (coupons) in tandem. The samples were mounted in the reactor with three replicates of each coating per holder. There were eight holders per reactor. Samples were washed in the assembled reactor by passing water through the reactor for 16-24 h prior to starting the experiment. The assembled reactor was then autoclaved (15 minutes at 121° C.) followed by filling with approximately 350 mL growth medium from a reservoir containing 10 liters of sterile 2% Bacto tryptic soy broth (TSB) (Becton, Dickinson and Co., Sparks, Md.) in ultrapure water. The reactor was then inoculated with 0.4 mL of a 5 mL overnight culture of the test bacterial strain in TSB. The reactor culture was incubated for 24 hours with stirring (130 RPM) without flow of growth medium from the reservoir to allow attachment and growth of cells. Fresh growth medium from the reservoir was then passed through the reactor at rate of approximately 400 mL per hour for an additional 24 hours to facilitate biofilm growth, also with stirring (130 RPM). All incubations were at 37° C.

These growth conditions were used for *Staphylococcus epidermidis* ATCC #35984, and *Escherichia coli* K12. For *Streptococcus mutans* ATCC #25175, the protocol was altered as follows: the growth medium was 10% TSB, the inoculation was with 1.0 mL of an overnight culture, and the stir rate was 310 RPM. For *Aeromonas hydrophila* ATCC# 7966, the protocol was altered as follows: the growth medium was 2% TSB with 0.1% glucose, and all incubations were at room temperature.

After incubation, the rods, intact coupon samples and adherent biofilm were removed from the CDC reactor and stained in water saturated with crystal violet for 45 seconds. The rod and samples were then rinsed with phosphate-buffered saline 20-40 times to remove excess crystal violet and any loosely adhered cells. The coupons were removed from the rods and placed into a 15 mL Falcon tube (BD Biosciences, Bedford, Mass.) containing 4 mL of ethanol into which the crystal violet was eluted by vortexing (Vortex Genie 2, Scientific Industries, Bohemia, N.Y.) for approximately 10 seconds. The absorbance of ethanol solutions ($\lambda$=590 nm) using a Genesys 6 spectrophotometer (Thermo Electron Corp., Madison, Wis.) was measured to estimate the amount of biofilm adhered to the polycarbonate coupons. Values presented are the average absorbance of triplicate samples. For materials that also stained with crystal violet regardless of the presence of biofilm (background staining), the amount of material staining was quantified by removing the test coupon from the ethanol solution, gently scrubbing the coupon under flowing water to remove adherent biofilm and then restaining with crystal violet, rinsing and eluting into ethanol as described above. These background absorbance values were then subtracted from the values obtained by staining the coupon with adherent biofilm. Results are included in Table 3 and illustrated in FIGS. 1-7

TABLE 1

Polymer Chemical Compositions

| Polymer # | Amt. n-decyl methacrylate (g) | Amt. iso-decyl methacrylate (g) | Amt. lauryl methacrylate (g) | Amt. stearyl methacrylate (g) | Amt. PEG (1000) (g) | Amt. CW 750 mono-methacrylate (g) | Amt. meth-acryloxypropyl trimethoxy silane (g) | Amt. meth-acryloxypropyl triethoxy silane (g) | Amt. mercaptopropyl trimethoxy silane (g) |
|---|---|---|---|---|---|---|---|---|---|
| 1 | 3.92 | 0 | 0 | 0 | 0 | 0 | 0.44 | 0 | 0.022 |
| 2 | 2.94 | 0 | 0 | 0 | 1.014 | 0 | 0.44 | 0 | 0.022 |
| 3 | 1.987 | 0 | 0 | 0 | 1.996 | 0 | 0.44 | 0 | 0.022 |
| 4 | 0.98 | 0 | 0 | 0 | 2.96 | 0 | 0.44 | 0 | 0.026 |
| 5 | 0 | 3.92 | 0 | 0 | 0 | 0 | 0.452 | 0 | 0.021 |
| 6 | 0 | 2.94 | 0 | 0 | 0.997 | 0 | 0.44 | 0 | 0.022 |
| 7 | 0 | 1.975 | 0 | 0 | 1.982 | 0 | 0.44 | 0 | 0.022 |
| 8 | 0 | 0.98 | 0 | 0 | 2.96 | 0 | 0.44 | 0 | 0.03 |
| 9 | 0 | 0 | 3.96 | 0 | 0 | 0 | 0 | 0.44 | 0.022 |
| 10 | 0 | 0 | 3.56 | 0 | 0.4 | 0 | 0 | 0.44 | 0.022 |
| 11 | 0 | 0 | 2.38 | 0 | 1.58 | 0 | 0.44 | 0 | 0.022 |
| 12 | 0 | 0 | 1.58 | 0 | 2.38 | 0 | 0.44 | 0 | 0.022 |
| 13 | 0 | 0 | 0.79 | 0 | 3.17 | 0 | 0.44 | 0 | 0.022 |
| 14 | 0 | 0 | 0 | 3.96 | 0 | 0 | 0 | 0.44 | 0.022 |
| 15 | 0 | 0 | 0 | 3.56 | 0.4 | 0 | 0 | 0.44 | 0.022 |
| 16 | 0 | 0 | 0 | 2.38 | 1.59 | 0 | 0.44 | 0 | 0.022 |
| 17 | 0 | 0 | 0 | 1.58 | 2.39 | 0 | 0.44 | 0 | 0.022 |
| 18 | 0 | 0 | 0 | 0.79 | 3.17 | 0 | 0.44 | 0 | 0.022 |
| 19 | 0 | 0 | 0 | 0 | 10.68 | 0 | 0 | 1.2 | 0.12 |
| 20 | 0 | 0 | 0 | 0 | 0 | 90 | 10 | 0 | 1 |

TABLE 2

Curable Coating Compositions

| Coating | Polymer | Amt. of Polymer (g) | Amt. A1170 (microliters) | Amt. toluene (g) | Amt. Heptane (g) | Amt. Ethanol (g) | Amt. MEK (g) | Amt. MIBK (g) | Amt. Acetone (g) | Amt. water (g) |
|---|---|---|---|---|---|---|---|---|---|---|
| 90% n-decyl | 1 | 0.5 | 100 | | 13.6 | 4.46 | | 1.56 | | |
| 67% n-decyl | 2 | 0.5 | 100 | | 11.6 | 6.67 | | 1.33 | | |
| 50% n-decyl | 3 | 0.5 | 100 | | 8.81 | 9.83 | | 1.01 | | |
| 22% n-decyl | 4 | 0.5 | 100 | | 6 | 12.94 | | 0.68 | | |
| 90% iso-decyl | 5 | 0.5 | 100 | | 13.6 | 4.46 | | 1.56 | | |
| 67% iso-decyl | 6 | 0.5 | 100 | | 11.6 | 6.69 | | 1.33 | | |
| 50% iso-decyl | 7 | 0.5 | 100 | | 8.81 | 9.83 | | 1.01 | | |
| 22% iso-decyl | 8 | 0.5 | 100 | | 6 | 12.93 | | 0.68 | | |
| 90% lauryl | 9 | 0.28 | 50 | 0.78 | 11.77 | 12.11 | | | | |
| 80% lauryl | 10 | 0.25 | 50 | 0.73 | 11.8 | 12.11 | | | | |
| 54% lauryl | 11 | 0.51 | 100 | 1.15 | 12.6 | 10.74 | | | | |
| 36% lauryl | 12 | 0.51 | 100 | 0.88 | 9.85 | 13.76 | | | | |
| 18% lauryl | 13 | 0.49 | 100 | 0.59 | 6.73 | 17.1 | | | | |
| 90% stearyl | 14 | 0.26 | 50 | 0.72 | 11.83 | 12.14 | | | | |
| 80% stearyl | 15 | 0.26 | 50 | 0.73 | 11.85 | 12.16 | | | | |
| 54% stearyl | 16 | 0.5 | 100 | 1.13 | 12.6 | 10.72 | | | | |
| 36% stearyl | 17 | 0.5 | 100 | 0.86 | 9.85 | 13.72 | | | | |
| 18% stearyl | 18 | 0.5 | 100 | 0.60 | 6.73 | 17.11 | | | | |
| Control A | 19 | 0.32 | 50 | | | 30.77 | 0.35 | | | 1 |
| Control B | 20 | 0.3 | 50 | | | 22.74 | 0.3 | | 7.9 | 1 |
| Blank | 21 | | | | | | | | | |

TABLE 3

Biofilm Retention Measurement Results using the CDC Reactor

| Polymer of Table 2 | Bacterial Species Used | Absorbance |
|---|---|---|
| 9 | *Escherichia Coli* | 0.9 ± 0.05 |
| 10 | " | 1.02 ± 0.21 |
| 11 | " | 0.09 |
| 12 | " | 0.24 ± 0.01 |
| 13 | " | −0.06 ± 0.01 |
| 19 | " | −0.12 |
| 20 | " | 0.55 ± 0.07 |
| 9 | *Aeromonas hydrophilia* | See FIG. 1 |

TABLE 3-continued

Biofilm Retention Measurement Results using the CDC Reactor

Figure 2:
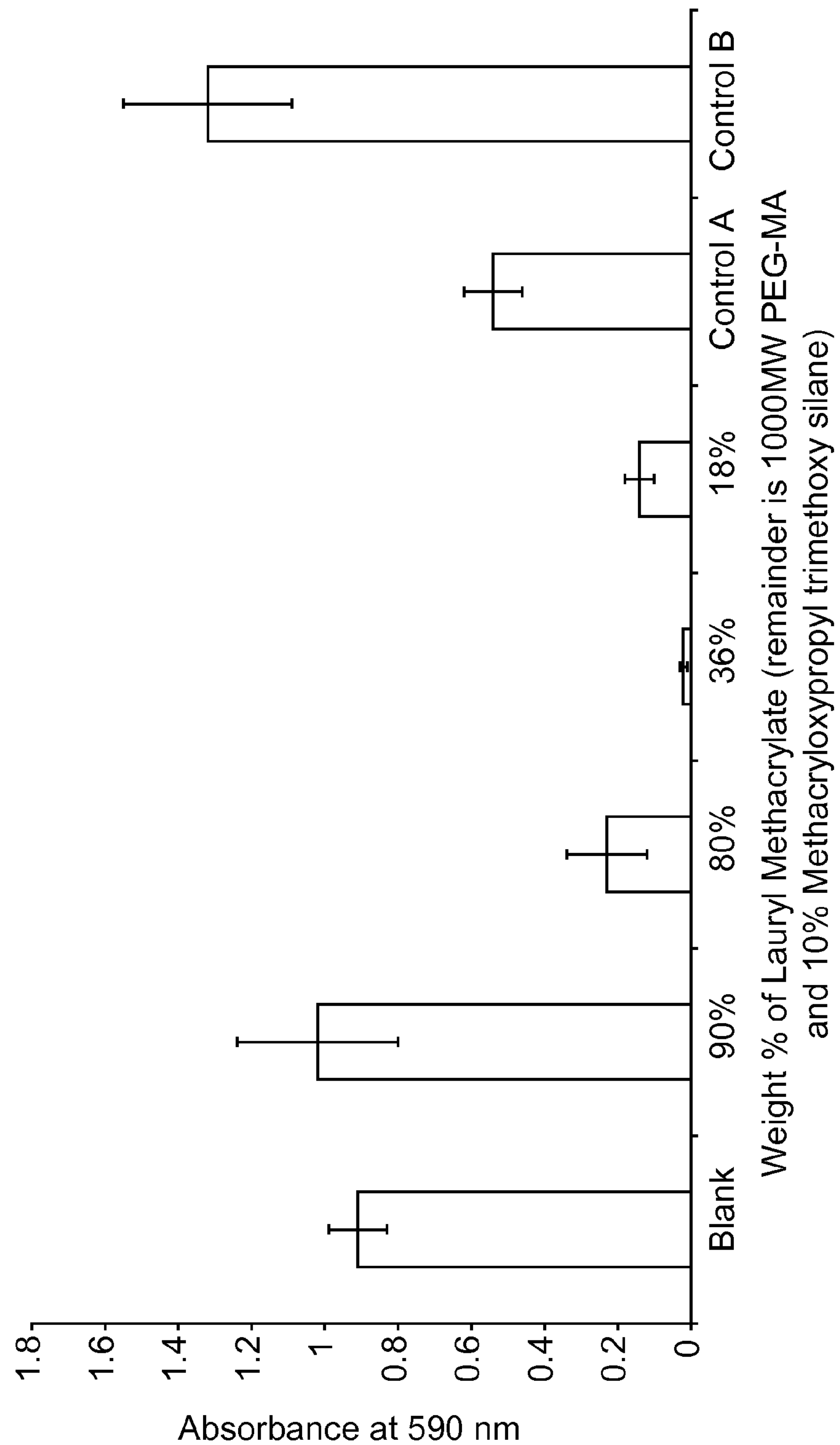
FIG. 2 shows data for the retention of biofilms on coated surfaces using lauryl methacrylate as the alkyl chain-bearing monomer. The bacterium used in the test is *Staphylococcus epidermidis.*

| Polymer of Table 2 | Bacterial Species Used | Absorbance |
|---|---|---|
| 10 | " | " |
| 12 | " | " |
| 13 | " | " |
| 19 | " | " |
| 20 | " | " |
| 21 | " | " |
| 9 | *Staphylococcus epidermidis* | See FIG. 2 |

TABLE 3-continued

Biofilm Retention Measurement Results using the CDC Reactor

Figure 3:
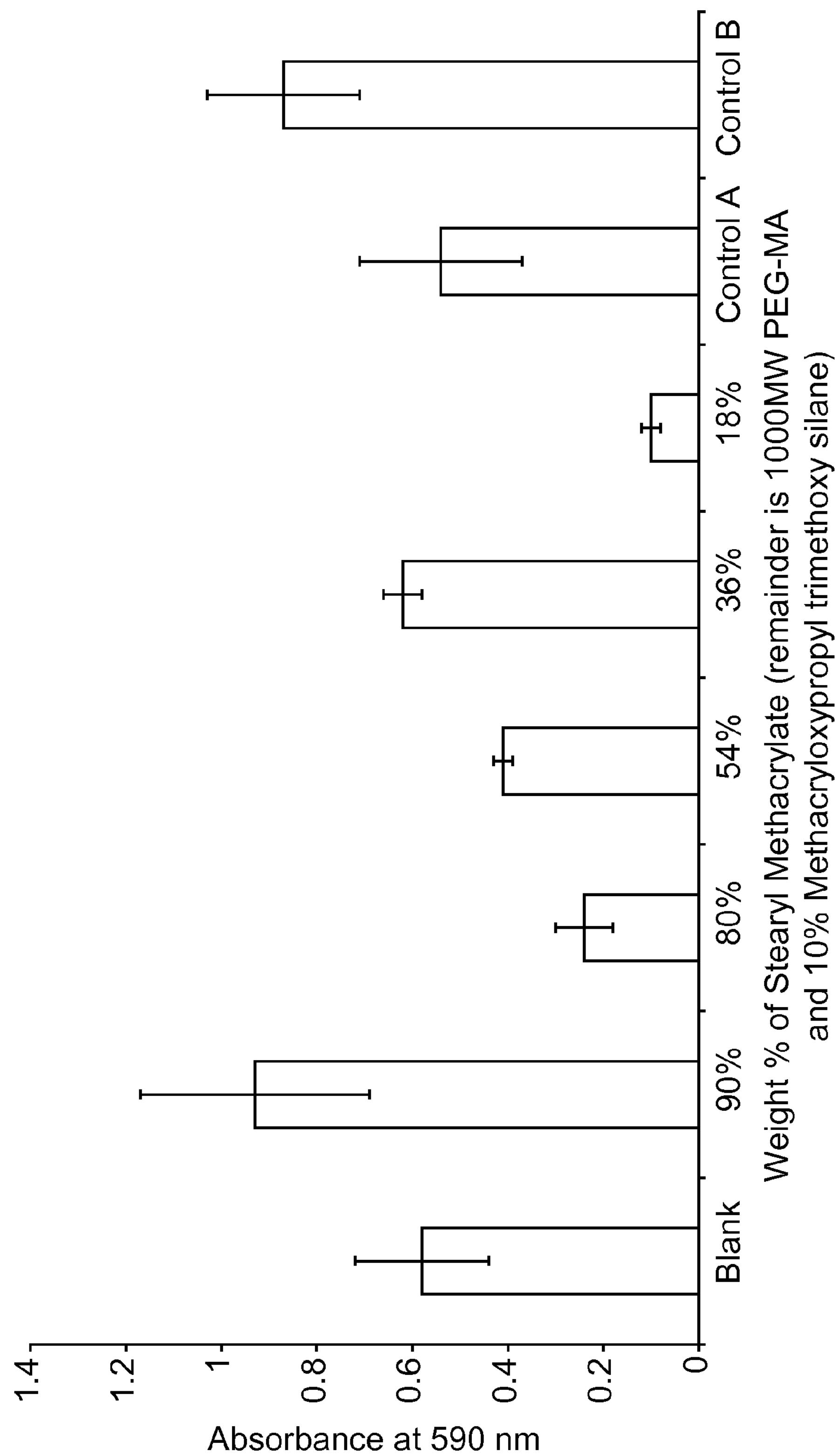
FIG. 3 shows data for the retention of biofilms on coated surfaces using stearyl methacrylate as the alkyl chain-bearing monomer. The bacterium used in the test is *Staphylococcus epidermidis.*
Figure 4:
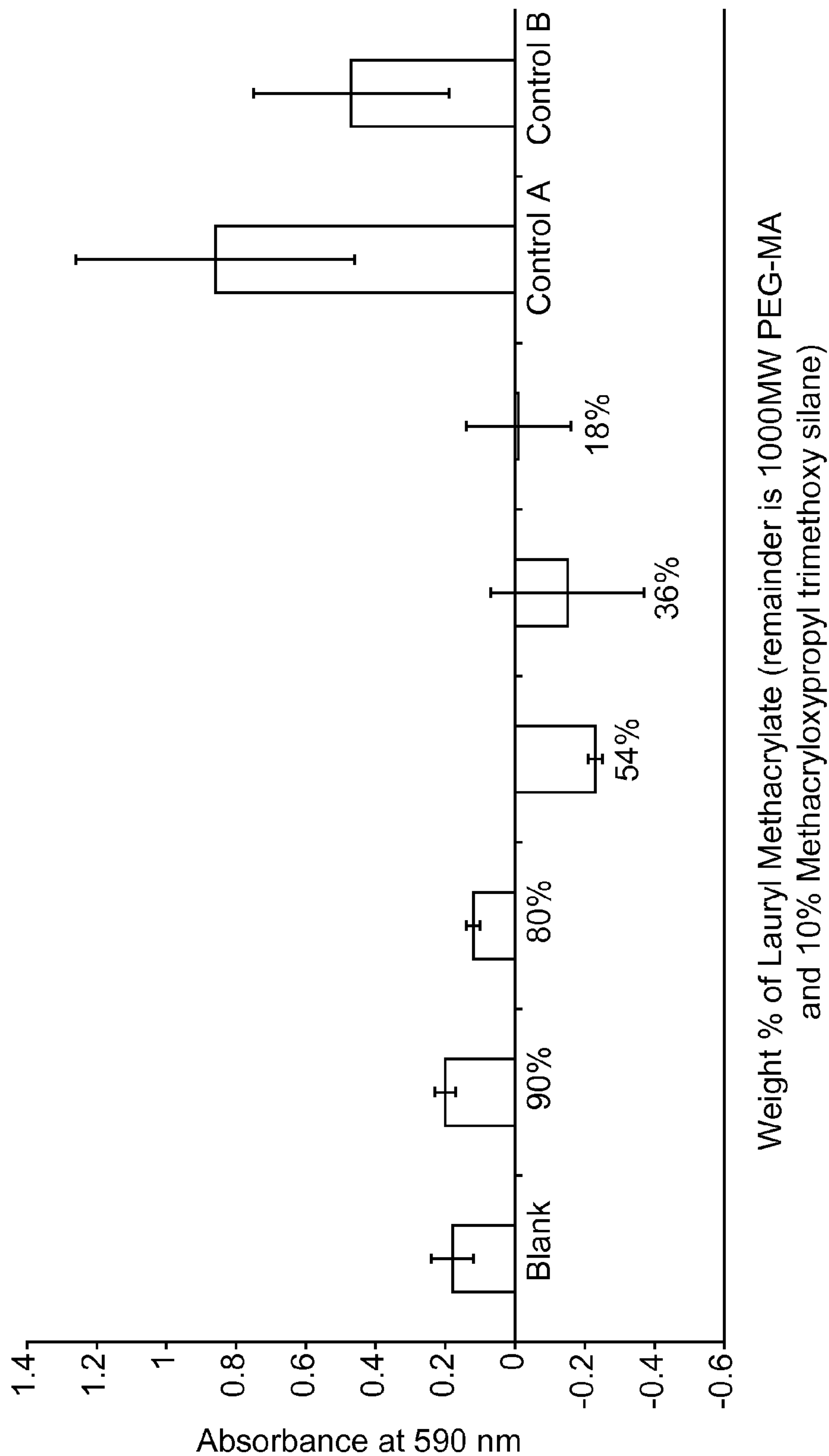
FIG. 4 shows data for the retention of biofilms on coated surfaces using lauryl methacrylate as the alkyl chain-bearing monomer. The bacterium used in the test is *Streptococcus mutans*.
Figure 5:
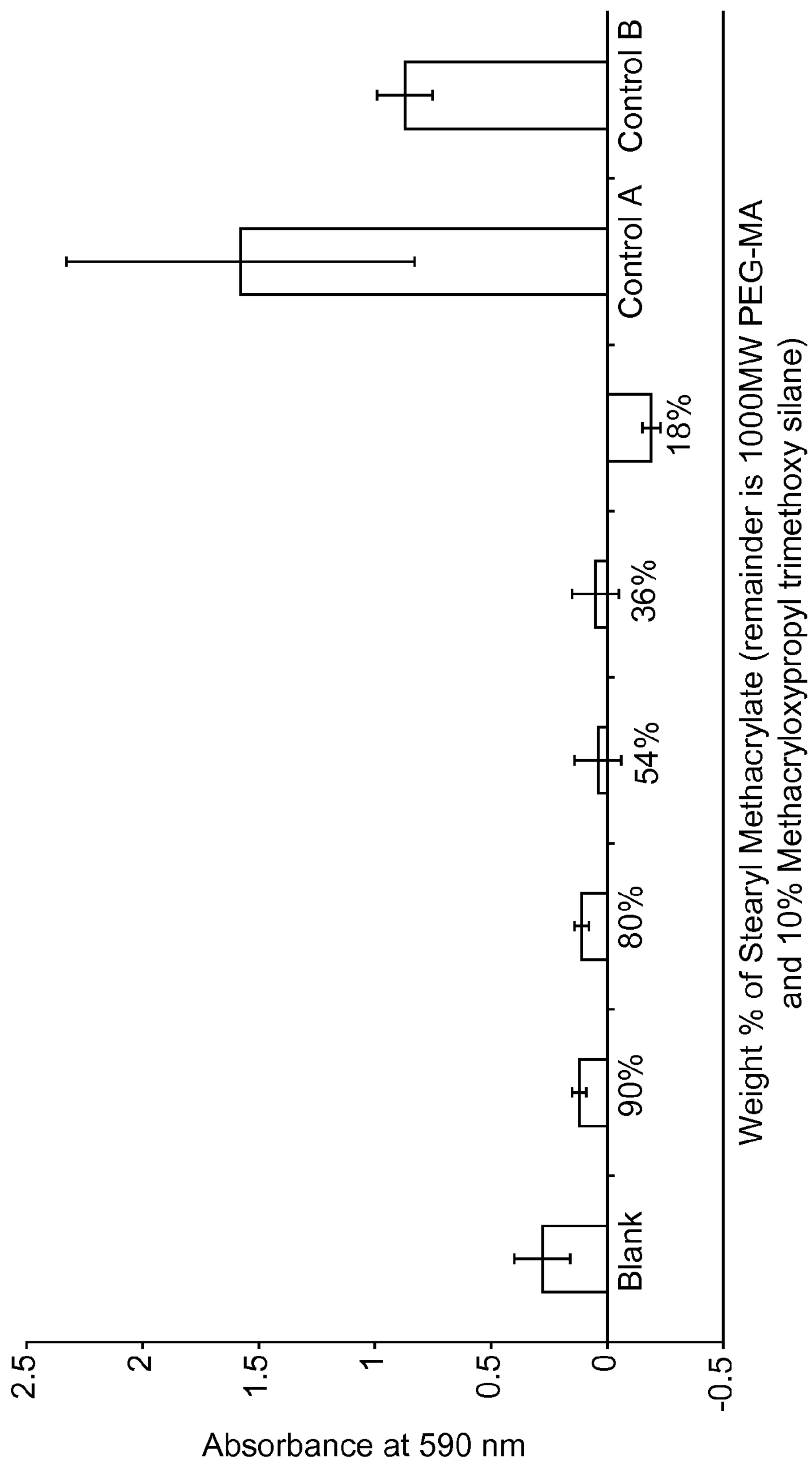
FIG. 5 shows data for the retention of biofilms on coated surfaces using stearyl methacrylate as the alkyl chain-bearing monomer. The bacterium used in the test is *Streptococcus mutans*.
Figure 6:
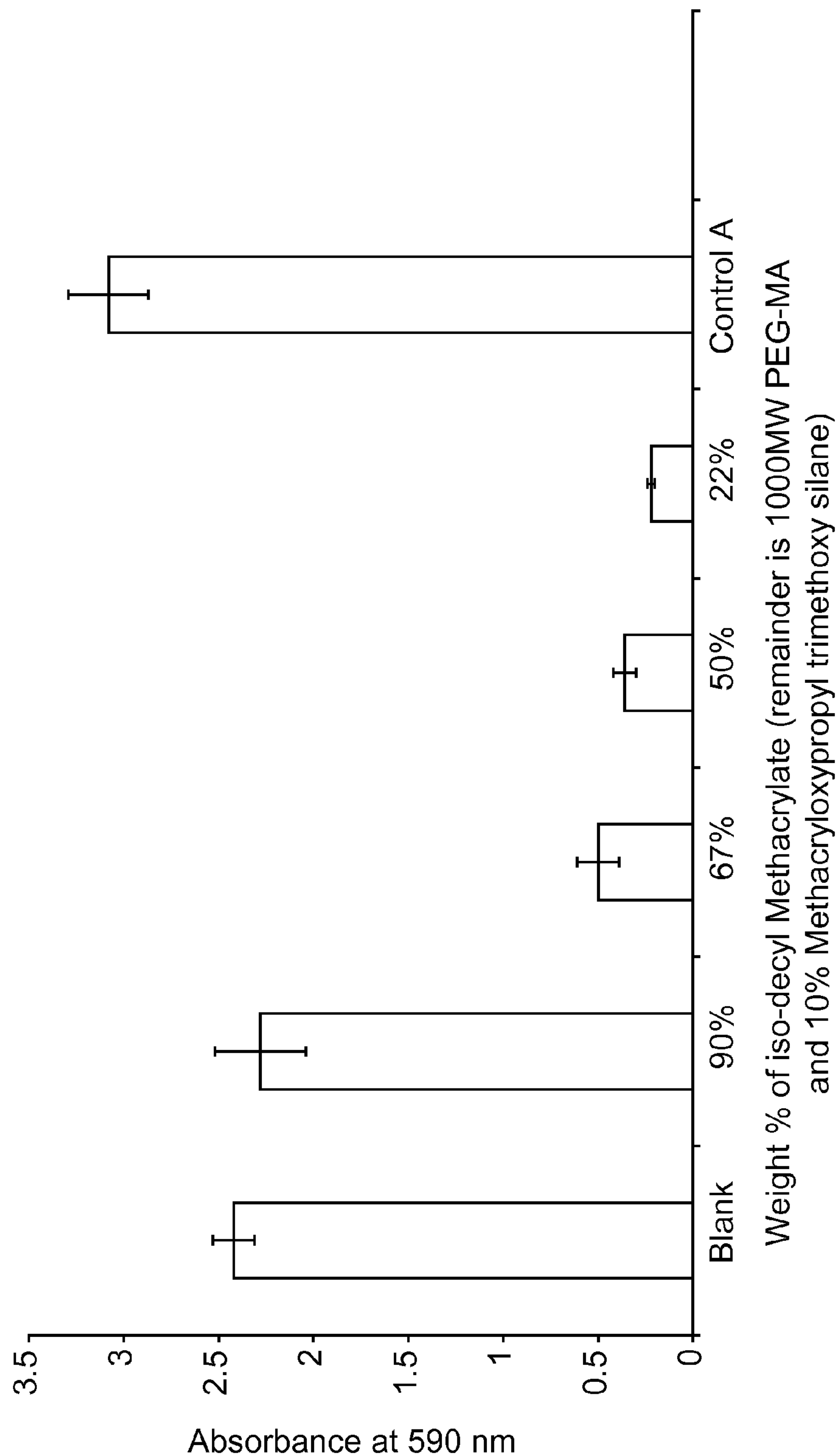
FIG. 6 shows data for the retention of biofilms on coated surfaces using iso-decyl methacrylate as the alkyl chain-bearing monomer. The bacterium used in the test is *Staphylococcus epidermidis*.
Figure 7:
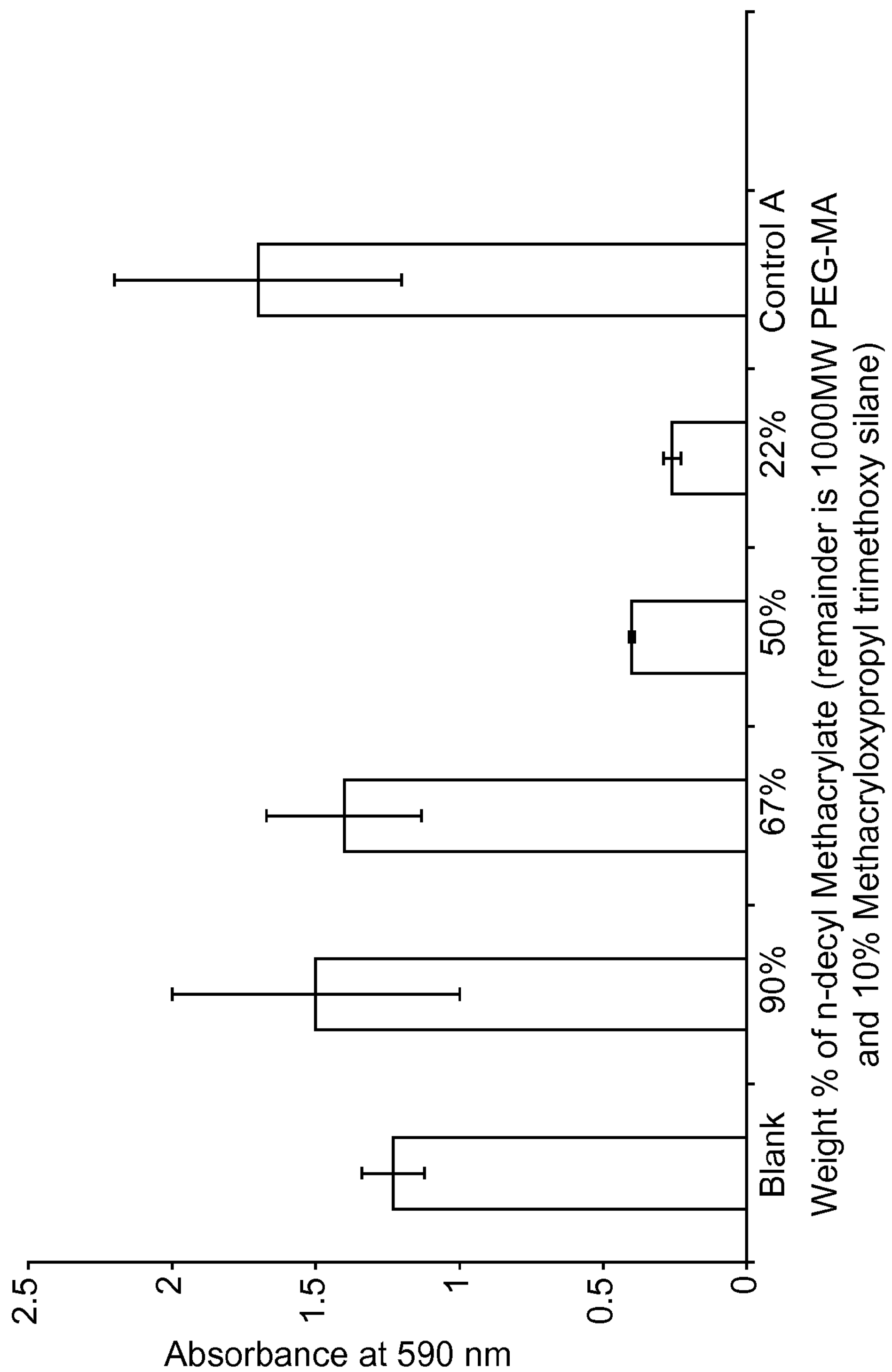
FIG. 7 shows data for the retention of biofilms on coated surfaces using n-decyl methacrylate as the alkyl chain-bearing monomer. The bacterium used in the test is *Staphylococcus epidermidis*.

| Polymer of Table 2 | Bacterial Species Used | Absorbance |
|---|---|---|
| 10 | *Staphylococcus epidermidis* | " |
| 12 | *Staphylococcus epidermidis* | " |
| 13 | *Staphylococcus epidermidis* | " |
| 19 | *Staphylococcus epidermidis* | " |
| 20 | *Staphylococcus epidermidis* | " |
| 21 | *Staphylococcus epidermidis* | " |
| 14 | *Staphylococcus epidermidis* | See FIG. 3 |
| 15 | *Staphylococcus epidermidis* | " |
| 16 | *Staphylococcus epidermidis* | " |
| 17 | *Staphylococcus epidermidis* | " |
| 18 | *Staphylococcus epidermidis* | " |
| 19 | *Staphylococcus epidermidis* | " |
| 20 | *Staphylococcus epidermidis* | " |
| 21 | *Staphylococcus epidermidis* | " |
| 9 | *Streptococcus mutans* | See FIG. 4 |
| 10 | " | " |
| 11 | " | " |
| 12 | " | " |
| 13 | " | " |
| 19 | " | " |
| 20 | " | " |
| 21 | " | " |
| 14 | *Streptococcus mutans* | See FIG. 5 |
| 15 | " | " |
| 16 | " | " |
| 17 | " | " |
| 18 | " | " |
| 19 | " | " |
| 20 | " | " |
| 21 | " | " |
| 5 | *Staphylococcus epidermidis* | See FIG. 6 |
| 6 | *Staphylococcus epidermidis* | " |
| 7 | *Staphylococcus epidermidis* | " |
| 8 | *Staphylococcus epidermidis* | " |
| 19 | *Staphylococcus epidermidis* | " |
| 21 | *Staphylococcus epidermidis* | " |
| 1 | *Staphylococcus epidermidis* | See FIG. 7 |
| 2 | *Staphylococcus epidermidis* | " |
| 3 | *Staphylococcus epidermidis* | " |
| 4 | *Staphylococcus epidermidis* | " |
| 19 | *Staphylococcus epidermidis* | " |
| 21 | *Staphylococcus epidermidis* | " |

The invention claimed is:

1. A curable composition comprising:

a) a polymer having pendent surface substrate-reactive functional groups derived from ethylenically unsaturated monomer units having pendent long-chain aliphatic groups; ethylenically unsaturated monomer units having pendent poly(oxyalkylene) groups; and ethylenically unsaturated monomer units having pendent surface substrate-reactive functional groups selected from monophosphate, phosphonate, phosphonic acid, hydroxamic acid, isonitrile, silyl, amine, pyridinyl, or disulfide groups; and b) a crosslinking agent of the formula $R^8(Z)_m$ where $R^8$ comprises a non-polymeric aliphatic, cycloaliphatic, aromatic or alkyl-substituted aromatic moiety having from 1 to 30 carbon atoms that has a valence of m, where m is at least 2, and Z is a reactive functional group that is co-reactive with the surface substrate-reactive functional group of the polymer.

2. The curable composition of claim 1, said polymer having a solubility of less than 0.1 wt. % in water.

3. The curable composition of claim 1, wherein said ethylenically unsaturated groups of the ethylenically unsaturated monomer units are (meth)acryloyl groups.

4. The curable composition of claim 1 wherein said pendent poly(oxyalkylene) groups are poly(oxyethylene) groups.

5. The curable composition of claim 1, said polymer comprising;

10 to 70 wt. % of ethylenically unsaturated units having pendent long chain aliphatic groups;

10 to 80 wt. % of ethylenically unsaturated units having pendent poly(oxyalkylene) groups;

1-20 wt. % of ethylenically unsaturated units having pendent surface substrate-reactive functional groups; and 0 to 20 wt. % of other monomers.

6. The composition of claim 1 wherein the reactive functional groups of the crosslinking agent and the substrate-reactive groups of the polymer are the same functional groups.

7. The curable composition of claim 1 wherein monomer having pendent poly(oxyalkylene) groups is of the formula:

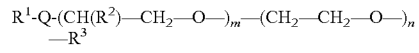

$$R^1\text{-}Q\text{-}(CH(R^2)—CH_2—O—)_m—(CH_2—CH_2—O—)_n—R^3$$

wherein, $R^1$ is a ethylenically unsaturated polymerizable group, $R^2$ is a $(C_1\text{-}C_4)$ alkyl group, $R^3$ is H, or $R^2$, or an aryl group, or combination thereof, Q is a divalent linking group, n is at least 5, m is 0 to less that 495, n+m is at least 5 and less than 500; and the mole ratio of n:m is at least 2:1.

8. The curable composition of claim 7, wherein the mole ratio of n to m (n:m) is greater than 3:1.

9. The curable composition of claim 7 where $R^1$-Q- is selected from vinyl, allyl, vinyloxy, allyloxy, (meth)acrylamido and (meth)acryloyl.

10. The curable composition of claim 1, wherein said a long chain aliphatic group containing monomer is of the general formula $R^1$-Q-$R_h$, (I) wherein $R^1$ is a ethylenically unsaturated polymerizable group, Q is a divalent linking group, and $R_h$ is a monovalent, linear or branched chain, cyclic or acyclic aliphatic group having from 8 to 75 carbon atoms.

11. The curable composition of claim 1, wherein the monomer having surface substrate-reactive functional groups is of the formula $R^1$-Q-X wherein:

$R^1$ is a ethylenically unsaturated polymerizable group,

Q is a divalent linking group, and

X is a surface substrate-reactive functional group that is capable of bonding with a substrate.

12. The composition of claim 1, wherein said crosslinking agent is of the formula $R^{10}(\text{—Si}(Y)_x(R^7)_{3-x})_p$, wherein Y is a hydrolysable group and $R^7$ is a monovalent alkyl or aryl group, x is 1, 2 or 3, p is at least 2 and $R^{10}$ is a polyvalent alkylene group of 3 to 10 carbon atoms, optionally substituted by catenary oxygen or nitrogen atoms.

13. The composition of claim 12 further comprising an alkyl tin catalyst.

14. The composition of claim 1 further comprising a catalyst.

15. The composition of claim 1 further comprising 0.1 to 5 wt. % of a biocide.

16. The cured composition of claim 1.

17. A substrate bearing a coating of the cured composition of claim 1.

18. The substrate of claim 17 selected from ceramics, siliceous substrates, metal, stone, polymeric materials, paints, powder coatings, and wood.

19. The substrate of claim 17 selected from siliceous substrates.

20. The substrate of claim 17 where the siliceous substrate comprising a siliceous surface on a polymer film.

21. A coating composition comprising the curable composition of claim 1 and a solvent.

22. The coating composition of claim 21 comprising between 0.1 and 50 percent by weight of the curable composition.

23. The coating composition of claim 21 further comprising a biocide.

* * * * *

UNITED STATES PATENT AND TRADEMARK OFFICE

CERTIFICATE OF CORRECTION

PATENT NO. : 7,585,919 B2
APPLICATION NO. : 11/535255
DATED : September 8, 2009
INVENTOR(S) : Alphonsus V. Pocius It is certified that error appears in the above-identified patent and that said Letters Patent is hereby corrected as shown below:

On the title page,
Item [54] and Column 1, delete "POLYMER DERIVED FROM MONOMERS WITH LONG-CHAIN ALIPHATIC, POLY(OXYALKYLENE) AND SUBSTRATE-REACTIVE GROUPS" and insert -- CURABLE COMPOSITIONS AND BIOFILM-RESISTANT COATINGS THEREFROM --.

Column 3,
Line 37, delete "monomers," and insert -- monomers. --.
Line 64, delete "optional" and insert -- optionally --.

Column 4,
Line 67, delete "$—C_nH_{2n+1}$" and insert -- $—C_nH_{2n+1}$, --.

Column 5,
Line 17, delete "0," and insert -- 0, n --.

Column 7,
Line 44, delete "67;" and insert -- 67, --.
Line 46, delete "88;" and insert -- 88, --.
Line 53, delete "3;" and insert -- 3, --.

Column 9,
Line 60, delete "araliphatic" and insert -- aliphatic --.
Line 64, delete "1,4-diisocyanatocy clohexane," and insert -- 1,4-diisocyanatocy-clohexane, --.

Column 10,
Line 24, delete "$A\text{-}_{1170}$" and insert -- A-1170 --.

Column 14,
Line 67, after "1-7" insert -- . --.

UNITED STATES PATENT AND TRADEMARK OFFICE

CERTIFICATE OF CORRECTION

PATENT NO. : 7,585,919 B2
APPLICATION NO. : 11/535255
DATED : September 8, 2009
INVENTOR(S) : Alphonsus V. Pocius It is certified that error appears in the above-identified patent and that said Letters Patent is hereby corrected as shown below:

Column 18,
Line 17, delete "said" and insert -- the --.
Lines 23-24, delete "comprising;" and insert -- comprising: --.
Line 46, delete "that" and insert -- than --.

Signed and Sealed this

First Day of December, 2009

David J. Kappos
*Director of the United States Patent and Trademark Office*